Sept. 29, 1936.  H. R. TEAR  2,055,596
LUBRICATING DEVICE
Filed Nov. 9, 1934  2 Sheets-Sheet 1
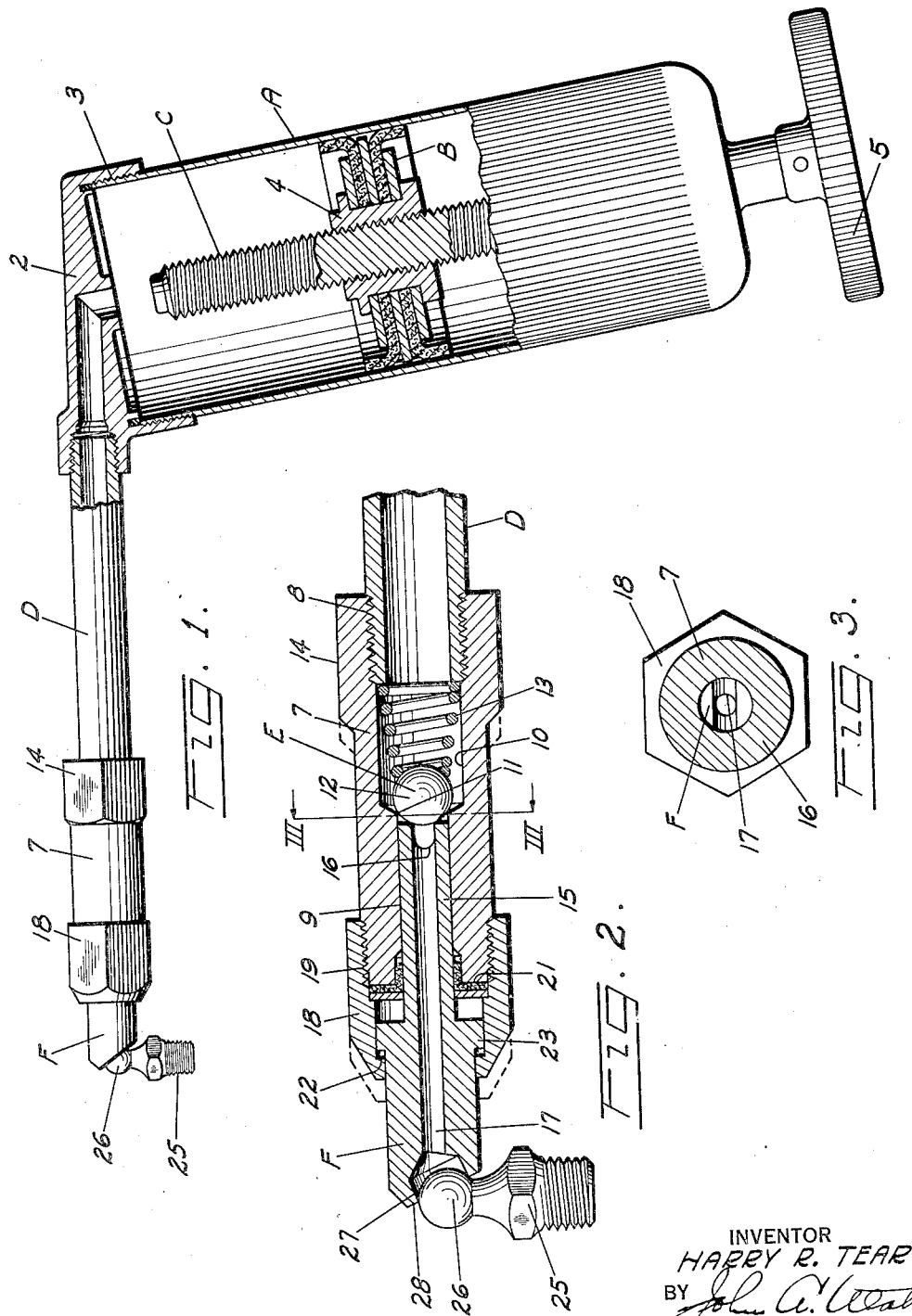
INVENTOR
HARRY R. TEAR
BY
ATTORNEY Sept. 29, 1936. H. R. TEAR 2,055,596
LUBRICATING DEVICE
Filed Nov. 9, 1934 2 Sheets-Sheet 2
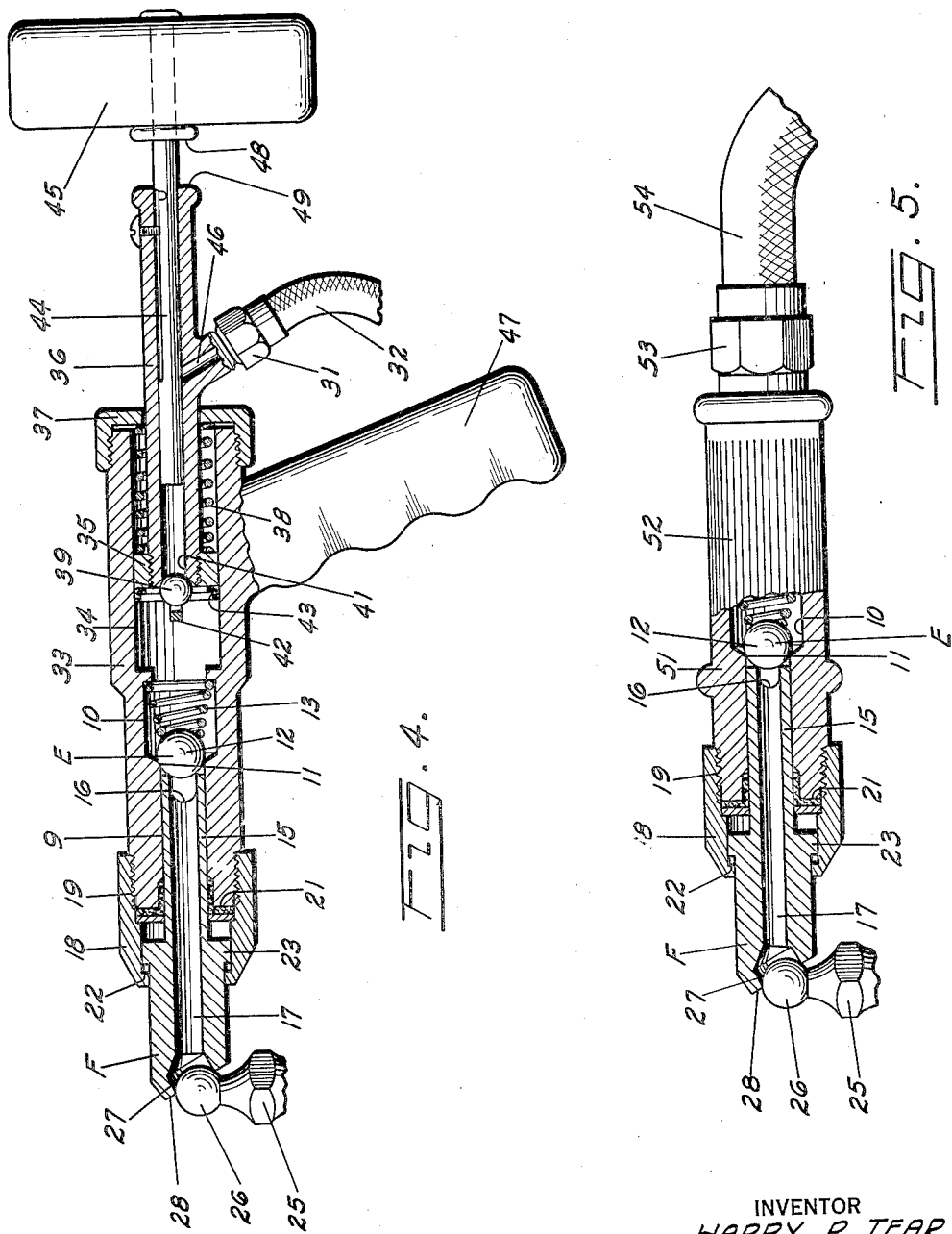
INVENTOR
HARRY R. TEAR
BY
ATTORNEY Patented Sept. 29, 1936

2,055,596

UNITED STATES PATENT OFFICE 2,055,596

LUBRICATING DEVICE

Harry R. Tear, Evanston, Ill.

Application November 9, 1934, Serial No. 752,323

8 Claims. (Cl. 221—47.4)

This invention relates to improvements in lubricating devices, and more particularly to hand lubricating guns incorporating a self-contained lubricant supply.

This application is a continuation in part of my co-pending application entitled "Lubricating devices" Serial No. 647,012 filed December 13, 1932.

An object of this invention is to provide a lubricant nozzle of the contact type for establishing communication between a source of lubricant supply and a lubricant-receiving fitting in which the valve controlling the flow of lubricant can be opened only when the nozzle is pressed against the fitting with sufficient pressure to seal the joint therebetween against leakage of lubricant.

A further object is to provide a hand lubricant gun incorporating means for building up a predetermined lubricant pressure within the gun prior to discharging the lubricant through its discharge nozzle into a lubricant receiving fitting.

Another object of the invention is to provide a hand lubricant gun including a discharge nozzle having means for normally closing the nozzle and for establishing lubricant communication therethrough only upon the application of thrust to the nozzle sufficient to produce a lubricant-tight seal between the nozzle and a lubricant-receiving fitting.

Other objects, the advantages and uses of the invention, will be or should become apparent after reading the following description and claims and after consideration of the accompanying drawings forming a part of this specification, in which:

Figure 1 is a side elevation, partly in section, illustrating a hand lubricant gun embodying the features of the invention;

Figure 2 is a sectional view of the discharge nozzle and control valve of the gun illustrated in Figure 1;

Figure 3 is a sectional view along the line III—III in Figure 2;

Fig. 4 is a side elevation, partially in section, of a hand operated booster nozzle constructed in accordance with the invention; and Fig. 5 is a view similar to Fig. 4 of a high pressure discharge nozzle representing another embodiment of the invention.

In general, the hand lubricant gun selected for illustration in Fig. 1 herein comprises, a lubricant reservoir and pressure cylinder A, a piston B mounted for reciprocation in the cylinder A, a manually operable screw C for advancing the piston B against the lubricant contents of the cylinder, a rigid discharge conduit D communicating with the cylinder A and supported thereupon, a discharge control valve E, of the ball type, located at the outer end of the conduit D, and a lubricant discharge nozzle F, of the contact type, disposed forwardly of the control valve E and arranged to open the valve when a predetermined thrust is applied thereto during the servicing operation.

Referring particularly to Figure 1 of the drawings, the conduit D is supported upon a casting 2 detachably secured to the cylinder A by cooperating screw threads 3 which serves as an end closure for the cylinder. The piston B has an internally threaded sleeve 4 extending therethrough with which the threads of the screw C are engaged. A hand grip 5 may be mounted upon the outer end of the screw C to facilitate the manual rotation of screw when it is desired to advance or retract the piston B within the cylinder A. The axis of the cylinder A may be inclined at a slightly obtuse angle relative to the conduit D, as shown, and the outer wall of the cylinder knurled so that the cylinder may serve the added function of a stock and hand grip for the manual support and manipulation of the gun when in use.

With reference to Figures 2 and 3, it will be noted that the nozzle F is telescopically mounted within a tubular member 7 secured to the forward end of the conduit D by threaded connection 8. The passageway through the member 7 comprises a bore 9, diametrically enlarged at its rearward end 10 to provide a valve seat 11 against which the ball 12 of the valve E is normally urged by a compression spring 13, one end of which may bear upon the outer end of the conduit D and the other end directly upon the ball, as shown. The rearward portion of the tubular member 7 may be provided with a hexagonal flange 14 to facilitate the removal and replacement of the tubular member.

The nozzle F is provided with a diametrically reduced rearward portion 15 having a close sliding fit within the bore 9 of the member 7. The rearward end of portion 15 may be diametrically slotted as shown at 16, the slot intersecting the rearward end of the lubricant passageway 17 of the nozzle. The reduced portion 15 of the nozzle is of sufficient length to engage with the ball 12 of the valve E, and to urge the valve to its open position against the force of the spring 13 upon further relative movement between the member 7 and the nozzle. A bushing 18 may be secured to the outer end of the tubular member 7 by screw threads 19 for the purpose of maintaining a packing gland 21 in place upon the outer end of the member 7, for engagement with the outer wall of the reduced nozzle portion 15, to establish a lubricant tight seal between the bore 9 and the nozzle. The bushing 18 may be further formed with a shoulder 22 on its inner wall against which a flange 23 located on the outer wall of the nozzle F may engage for limiting the outward movement of the nozzle relative to the member 7.

In the hand gun illustrated the nozzle F has been shown as designed for use with a lubricant receiving fitting 25 having a spherical head 26, and to this end, the nozzle is shown as provided with a discharge orifice the walls 27 of which are substantially cylindrical and concentric with an axis inclined with respect to the axis of the passageway 17 and of the conduit D. The outer face of the nozzle 28 is located in a plane perpendicular to the axis of the walls 27. This nozzle is of the type which affords a lubricant tight annular, metal to metal, contact with the fitting head 26 when sufficient thrust is applied to the nozzle to overcome the force of the lubricant under pressure admitted thereto, tending to separate the contacting surfaces. If desired, any other type of nozzle may obviously be substituted to provide proper lubricant tight connection with the particular style of fitting for which the gun is intended for use.

In operation, the reservoir of cylinder A may be readily filled after unscrewing the cylinder A from the casting 2 and retracting the piston B by manual rotation of the screw C. When the gun has thus been loaded and reassembled, the operator may turn the hand grip 5 thus causing the piston B to advance against the lubricant contents of cylinder until the lubricant within the cylinder is placed under a desired pressure. During this function of the gun the valve ball 12 will be held against its seat 11 by the force of the spring 13 and by the applied pressure to which the contents of cylinder A are subjected. The gun may be held in the hand of the operator by grasping the knurled side walls of cylinder A in much the same fashion as a pistol grip and the nozzle F directed upon the head 26 of the lubricant receiving fitting 25. Upon initial contact between the mouth of the discharge orifice of the nozzle and the spherical surface of the head 26, an annular contact seal is established, the effectiveness of which as a lubricant tight seal increases with the increase in thrust upon the nozzle. At this step in the servicing operation the operator may press forwardly upon the gun to cause thrust to be transmitted to the nozzle F through the medium of the spring 13 and the lubricant under pressure acting upon the ball 12 until sufficient force has been applied to cause the valve ball to be urged away from its seat 11, whereupon the lubricant under pressure within the cylinder A may flow through the valve, the passageway 17 of the nozzle, and into the fitting until the pressure within the gun balances the resistance to the flow of lubricant through the fitting and the various canals and crevices of the bearing or other part with which the fitting is associated.

When the gun is withdrawn from engagement with the fitting the valve ball 12 is again urged against the seat 11 by the spring 13, during which time the nozzle F is caused to move outwardly of the bore 9 by virtue of the contact between the ball 12 and the inner end of the nozzle. The gun is thereupon in readiness for a further charging and servicing cycle which may be continued as often as desired to meet the lubricant demand of the bearing or part to be lubricated.

It will be noted that the thrust required to lift the ball 12 off its seat 11 is proportional to the lubricant pressure plus the force of the spring 13. Furthermore the force required to maintain a lubricant tight seal between the fitting head 26 and the annular contact of the nozzle is proportional to the lubricant pressure. It is therefore apparent that by suitably proportioning the area of the valve seat 12 and the area within the annular contact surface, the nozzle may be so designed that the valve can be opened only when the thrust is sufficient to cause a lubricant tight seal with the fitting and thus avoid leakage of lubricant due to failure to urge the nozzle toward the fitting with sufficient force.

In Figure 4 I have illustrated a hand operated booster nozzle incorporating the features of my invention. This embodiment contains many of the elements of the embodiment of Figs. 1 and 2 which elements bear the reference numerals previously designated in the foregoing description. Instead of placing lubricant in a reservoir or barrel under pressure where it may be held in reserve for discharge through the nozzle, however, I provide in this form of the invention a connection 31 to which the lubricant supply hose 32 of a relatively low pressure lubricant supply source may be attached thus to decrease the weight of the device and to afford a substantially unlimited supply of lubricant. The body member 33 of the nozzle assembly corresponding to the member 7 of the device of Fig. 1 is formed to provide a pressure cylinder 34 at its rearward end communicating with the diametrically enlarged portion 10 of the bore 9. The diameter of the cylinder 34 is preferably larger than the portion 10 of the bore 9. A tubular piston 35 is slidably mounted within the cylinder 34 and is provided at its rearward end with a tubular extension 36 extending through a cap 37 which cap forms a rearward closure for the cylinder 34. A compression spring 38 is located between the piston 35 and the inner wall of the cap 37 thus to urge the piston assembly 35—36 forwardly in the cylinder 34 toward the nozzle valve E.

A check valve 39 may be located at the forward end of the bore 41 of the tubular piston 35 and retained in operative relationship with the mouth of the bore by a bridge 42 which may be formed integrally with the piston. Packing 43, annular in contour, may be located upon the inner face of the piston 35 to provide a lubricant tight piston seal. This arrangement results in the closing of both of the valves 12 and 39 under the influence of lubricant under pressure within the cylinder 34, the amount of pressure being determined by the compression of the spring 38. It is therefore apparent that unless the nozzle plunger F is urged inwardly, a relatively large quantity of lubricant may be held under pressure within the cylinder 34 of the nozzle booster assembly.

Means for admitting lubricant within the cylinder 34 and placing the lubricant under pressure therein is provided by a high pressure plunger 44 slidably mounted within the bore 41 of the piston assembly, a hand grip 45 being mounted on the rearward end of the plunger. An inlet passageway 46 located between the lubricant connection 31 and the bore 41 serves to establish communication between the pump thus formed and the supply hose 32. A pistol hand grip 47, secured to the body member 33, completes the nozzle booster assembly and may be used to support the device during operation and to permit of the application of manual thrust to the nozzle F against the head 26 of the lubricant receiving fitting 25.

In operation the device of Figure 4 while held by the hand grip 47 is manipulated to charge the cylinder 34 with lubricant under relatively high pressure. This operation is carried out by a reciprocation of the high pressure plunger 44, each stroke of the plunger forcing lubricant from the bore 41 admitted thereto through the inlet 46, into the cylinder 34 through the check valve 39. As lubricant is thus forced into the cylinder 34, the piston 35 will be urged rearwardly against the force of the compression spring 38 under relatively high pressure. The booster nozzle thus charged may be placed with the nozzle F against the head of the fitting and manual thrust applied thereto either by the pistol grip 47, the hand grip 45, or both, to urge the body 33 of the nozzle assembly with its associated parts forwardly relatively to the nozzle F thereby to open the outlet valve 12 as previously described. Such an arrangement insures the proper amount of thrust between the nozzle F and the head of the fitting prior to the admission of lubricant under pressure through the bore 17 of the nozzle into the port of the fitting thus to prevent leakage between the nozzle and fitting surfaces. In the event that the hand grip 45 is employed as a medium through which manual thrust is directed upon the nozzle assembly, the mounting ring 48 of the hand grip will be urged forwardly into contact with the rearward end 49 of the tubular extension 36 thus to transmit manual thrust directly to the piston 35. I have thus provided a contact discharge nozzle incorporating a high pressure booster mechanism capable of building up a high pressure within the discharge nozzle but assuring at all times that contact between the discharge nozzle F and the head of the fitting is established under a sufficiently high thrust or contact pressure to preclude leakage between the nozzle and the surface of the fitting.

In Figure 5 I have illustrated another form of the nozzle mechanism of Figure 2 which differs therefrom only in that the body 51 of the nozzle assembly is formed with a knurled hand grip portion 52 upon its outer walls and in the provision of a lubricant connection 53 for interconnecting the bore 10 of the nozzle body with the supply hose 54 of a high pressure lubricant source of supply. As in the case of the embodiments heretofore described, the passage of lubricant under pressure through the bore 17 of the discharge nozzle F may not take place until a sufficient degree of thrust is applied through the medium of the hand grip 52 to the nozzle F to establish an adequate lubricant tight seal between the discharge orifice wall of the nozzle and the surface of the fitting head.

It should be understood that the above embodiments of the invention are for the purpose of illustration only and various changes may be made therein without departing from the scope of the claims.

I claim:

1. A lubricating device comprising, a cylindrical reservoir, a piston slidably disposed in said reservoir, manually operable positive means for advancing said piston against the lubricant contents of said reservoir, a rigid conduit fixed to said reservoir and communicating therewith, a lubricant discharge nozzle member mounted upon said conduit and movable substantially along the axis thereof, a valve between said conduit and said nozzle member, said valve including a seat in said conduit and a movable element adapted to rest upon said seat and to bear upon the adjacent end of said nozzle member, and a spring arranged normally to close said valve and to urge said nozzle member forwardly relative to said conduit through the medium of said movable element of said valve.

2. A lubricating device comprising, a lubricant compressor including a cylinder, a piston in said cylinder and positive means for advancing said piston against the lubricant contents of said cylinder, a rigid conduit extending at an angle other than a straight angle from the discharge end of said cylinder and communicating therewith, a self-closing spring operated valve located in said conduit, and a lubricant discharge nozzle connected to said conduit, said nozzle being so arranged as to engage with and open said valve upon movement of the nozzle toward said conduit, said nozzle being normally urged outwardly of the conduit by said valve spring and at times in addition, by the action of lubricant under pressure on said valve.

3. A lubricating device comprising, a cylinder, a piston slidably disposed in said cylinder, a spring urging said piston inwardly of said cylinder, a high pressure pump located in said piston and having its outlet communicating with said cylinder, a check valve in said outlet, a discharge nozzle member mounted upon said cylinder and movable substantially along the axis thereof, and a discharge valve between said cylinder and said discharge nozzle, said discharge valve including a seat formed in said cylinder and a movable element adapted to rest upon said seat and to bear upon the adjacent end of said nozzle member, and a spring arranged normally to close said discharge valve and to urge the nozzle member forwardly relative to said cylinder through the medium of said movable element of said valve.

4. A lubricating device comprising, a rigid conduit, a lubricant discharge nozzle member slidably mounted in said conduit and having its outer end fashioned to provide a fitting engaging sealing contact face, a check valve within the conduit arranged normally to shut off flow of lubricant in the conduit into said nozzle member, said valve having an area upon which lubricant in said conduit may act to close the valve which is greater than the area of said nozzle member against which lubricant from the conduit may act to urge the nozzle member forwardly when said valve is open, and means mounted upon the conduit for increasing the lubricant pressure within the conduit, said means including a pump piston having a cross sectional area less than said valve area and a pressure storage piston having an area greater than the valve area.

5. A lubricating device comprising, a rigid conduit, a lubricant discharge nozzle member slidably mounted in said conduit and having its outer end fashioned to provide a fitting engaging sealing contact face, a check valve within the conduit arranged normally to shut off flow of lubricant in the conduit into said nozzle member, said valve having an area upon which lubricant in said conduit may act to close the valve which is greater than the area of said nozzle member against which lubricant from the conduit may act to urge the nozzle member forwardly when said valve is open, and means mounted upon the conduit for increasing the lubricant pressure within the conduit, said means including a pump piston having a cross sectional area less than said valve area and a pressure storage piston having an area greater than the valve area, and hand grips on said conduit and said pump piston respectively.

6. A lubricating device comprising, a cylinder having an outlet opening, a tubular piston in the cylinder having a lubricant inlet opening therein, resilient means urging said piston into the cylinder, and a high pressure piston reciprocably mounted in said tubular piston.

7. A lubricating device comprising, a cylinder having an outlet opening, a tubular piston in the cylinder having a lubricant inlet opening therein, resilient means urging said piston into the cylinder, and a high pressure piston of less cross-sectional area than the tubular piston reciprocably mounted in the tubular piston.

8. A lubricating device comprising, a cylinder, a high pressure pump including a cylinder in said first cylinder and connected to a source of lubricant supply and having an outlet communicating with said first cylinder a piston reciprocable in said pump cylinder to force lubricant into said first cylinder under pressure, a second piston slidable in said first cylinder, resilient means urging said second piston into said cylinder and adapted to be compressed by lubricant pressure in the cylinder, and a valved outlet from the cylinder.

HARRY R. TEAR.